(12) United States Patent
Chen

(10) Patent No.: US 6,243,539 B1
(45) Date of Patent: Jun. 5, 2001

(54) PARALLAX COMPENSATION APPARATUS FOR CAMERA

(75) Inventor: Shun-Shiung Chen, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/511,097

(22) Filed: Feb. 23, 2000

(51) Int. Cl.[7] .................................................. G03B 13/14
(52) U.S. Cl. ................................................................ 396/377
(58) Field of Search .................................... 396/373, 377, 396/378, 381, 383

(56) References Cited

U.S. PATENT DOCUMENTS

| | | | |
|---|---|---|---|
| 2,012,514 | * 8/1935 | Mitchell | 396/377 |
| 2,300,245 | * 10/1942 | Bell | 396/377 |
| 2,552,244 | * 5/1951 | White | 396/353 |
| 3,333,521 | * 8/1967 | Daniel, Jr. | 396/149 |
| 3,664,250 | * 5/1972 | Land | 396/378 |
| 5,117,247 | * 5/1992 | Nakai et al. | 396/377 |

* cited by examiner

*Primary Examiner*—David M. Gray
(74) *Attorney, Agent, or Firm*—Birch, Stewart, Kolasch & Birch, LLP

(57) ABSTRACT

An apparatus for compensating parallax in taking a close-up picture by a camera comprises a viewfinder pivotably connected to camera for locating objects to be taken, a follower link pivotably connected to camera having one end pivotably connected to the viewfinder for causing the viewfinder to pivot therealong, and an adjusting device connected to the follower link for causing follower link to pivot by moving the adjusting device such that optical axis of the viewfinder meets optical axis of lens in a subject to be taken. This can compensate for parallax.

17 Claims, 5 Drawing Sheets

PARALLAX COMPENSATION APPARATUS FOR CAMERA

BACKGROUND OF THE INVENTION

1. Field of the Invention

The present invention relates to a camera and more particularly to an apparatus for compensating parallax in taking a close-up picture in a manual focus by a camera.

2. Related Art

A parallax occurred in taking a close-up picture on subject 20 by a conventional camera 10 is shown in FIG. 1. It is understood that parallax is defined as the difference between the area taken in by a camera lens 12 and the area seen in the viewfinder 11. This is commonly found in commercially available viewfinder-type twin-lens reflex camera and digital camera. Further, the amount of angular degree of such parallax becomes larger as the subject 20 is approaching camera 10. This is not desirable.

The correctness of view finding is adversely affected if a picture is taken at an angle other than eye level such as high or low angle. This may be corrected if a camera user moves the camera based on the height of subject in order to make eye 30 align with viewfinder 11. However, such technique has a limit if the subject is out of the sight of eye 30 despite of above camera movement. It is understood that picture taken under this condition is not good. Thus improvement exists.

SUMMARY OF THE INVENTION

It is an object of the present invention to provide a parallax compensation apparatus for camera for adjusting the difference between the position taken in by a camera lens and the position seen in the viewfinder in taking a close-up picture. With this, the parallax as experienced by prior art is eliminated.

The advantages of the present invention are realized by providing a parallax compensation apparatus for camera comprising a viewfinder pivotably connected to main body of camera for locating objects to be taken; a follower link unit pivotably connected to main body of camera having one end pivotably connected to viewfinder for causing viewfinder to pivot therealong; and an adjusting unit having one end connected to the other end of follower link unit for causing follower link unit to rotate by moving adjusting unit such that optical axis of viewfinder meets optical axis of lens in the subject to be taken.

There is an adjustment unit may be additionally provided by the invention for changing direction. As such, the moving direction of adjusting unit is the same as the moving direction of viewfinder when user rotates or moves the adjusting unit.

There is an adjusting wheel may be further provided by the invention for connecting to follower link unit. As such, viewfinder may move as adjusting wheel rotates. This also achieves the purpose of compensating parallax.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
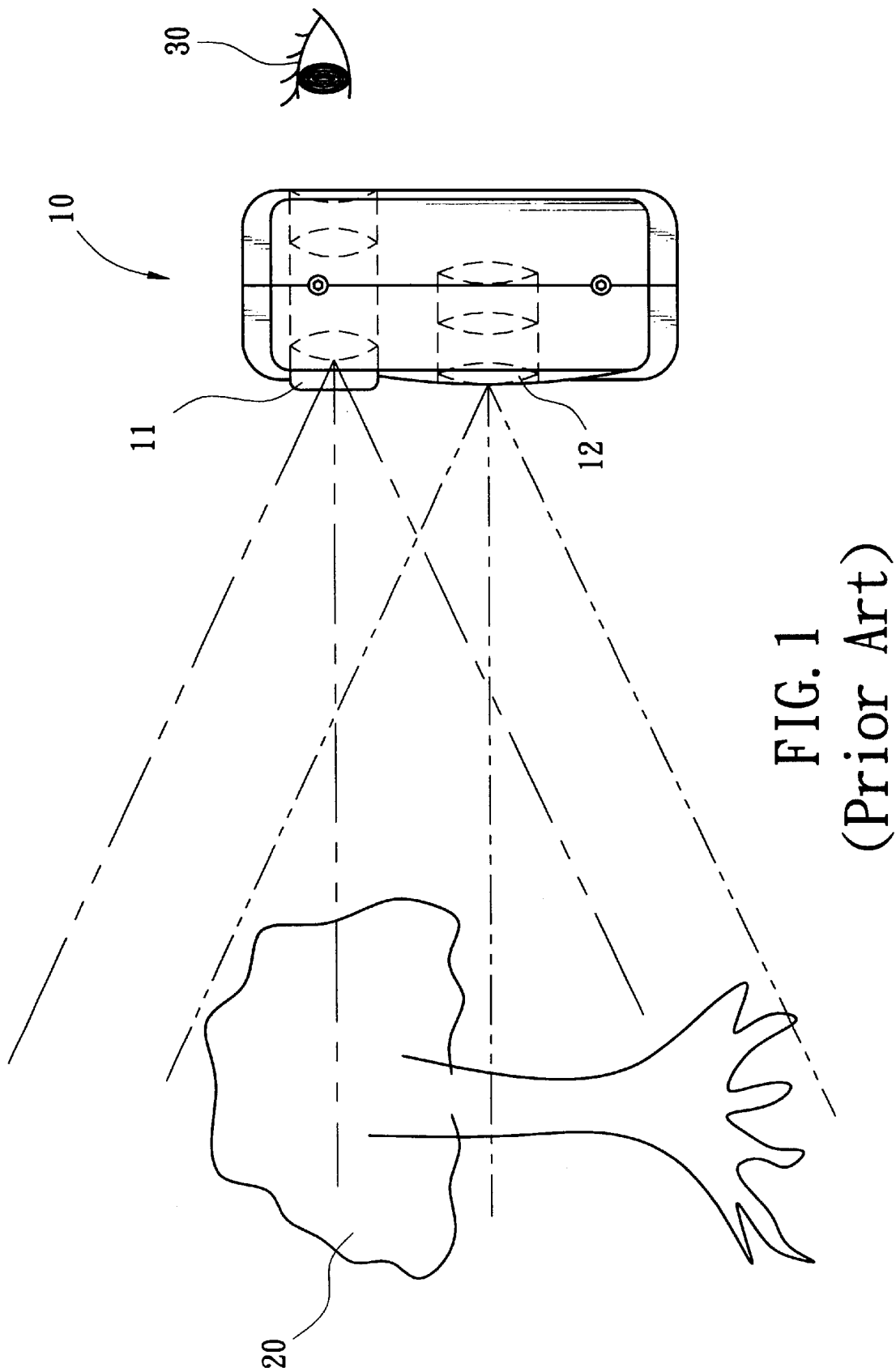
FIG. 1 is a side view schematically illustrating parallax occurred in a prior art camera.
Figure 2:
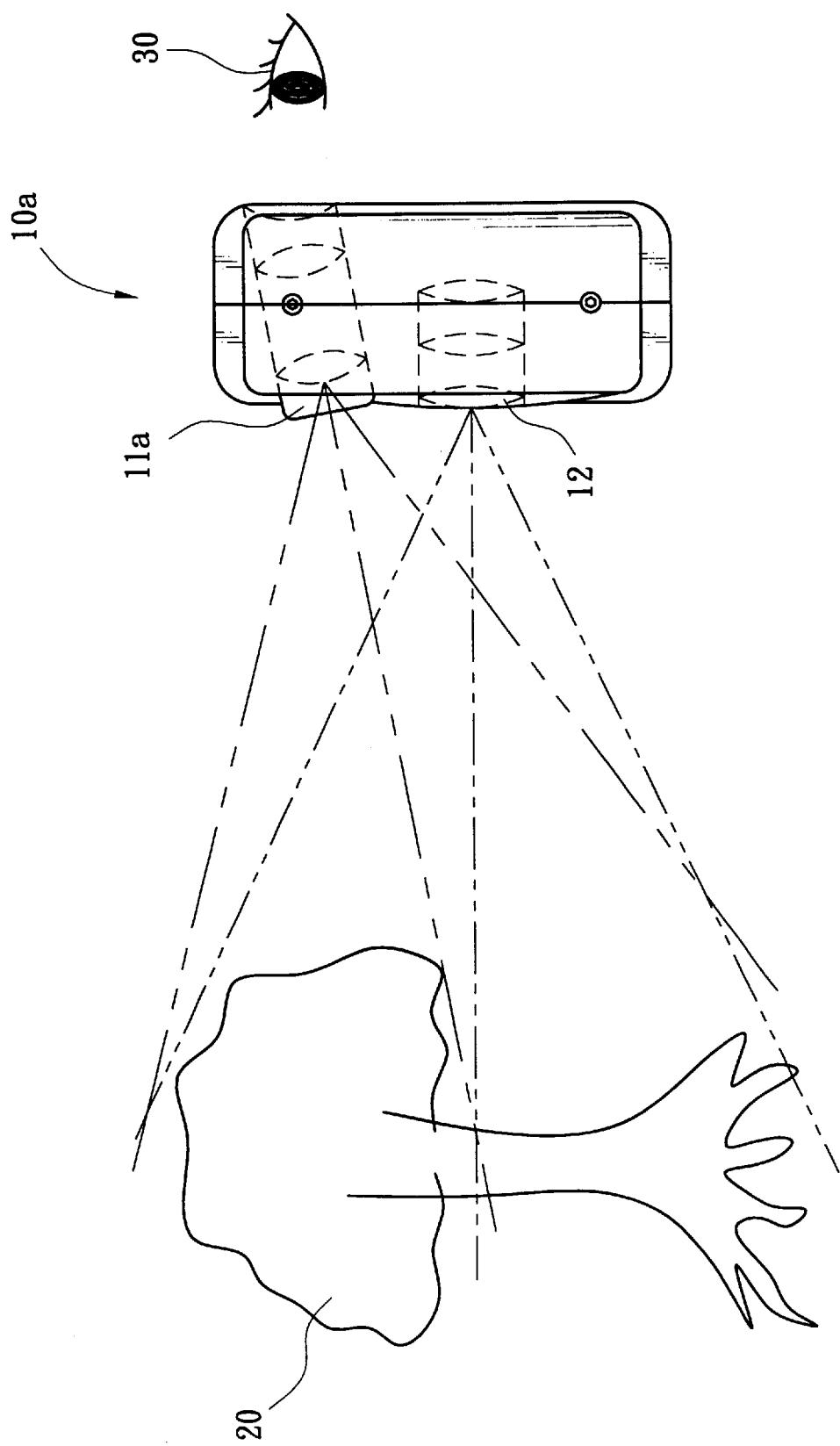
FIG. 2 is a side view schematically illustrating a compensated parallax as adjusted by a parallax compensation apparatus for camera of the invention.
Figure 3:
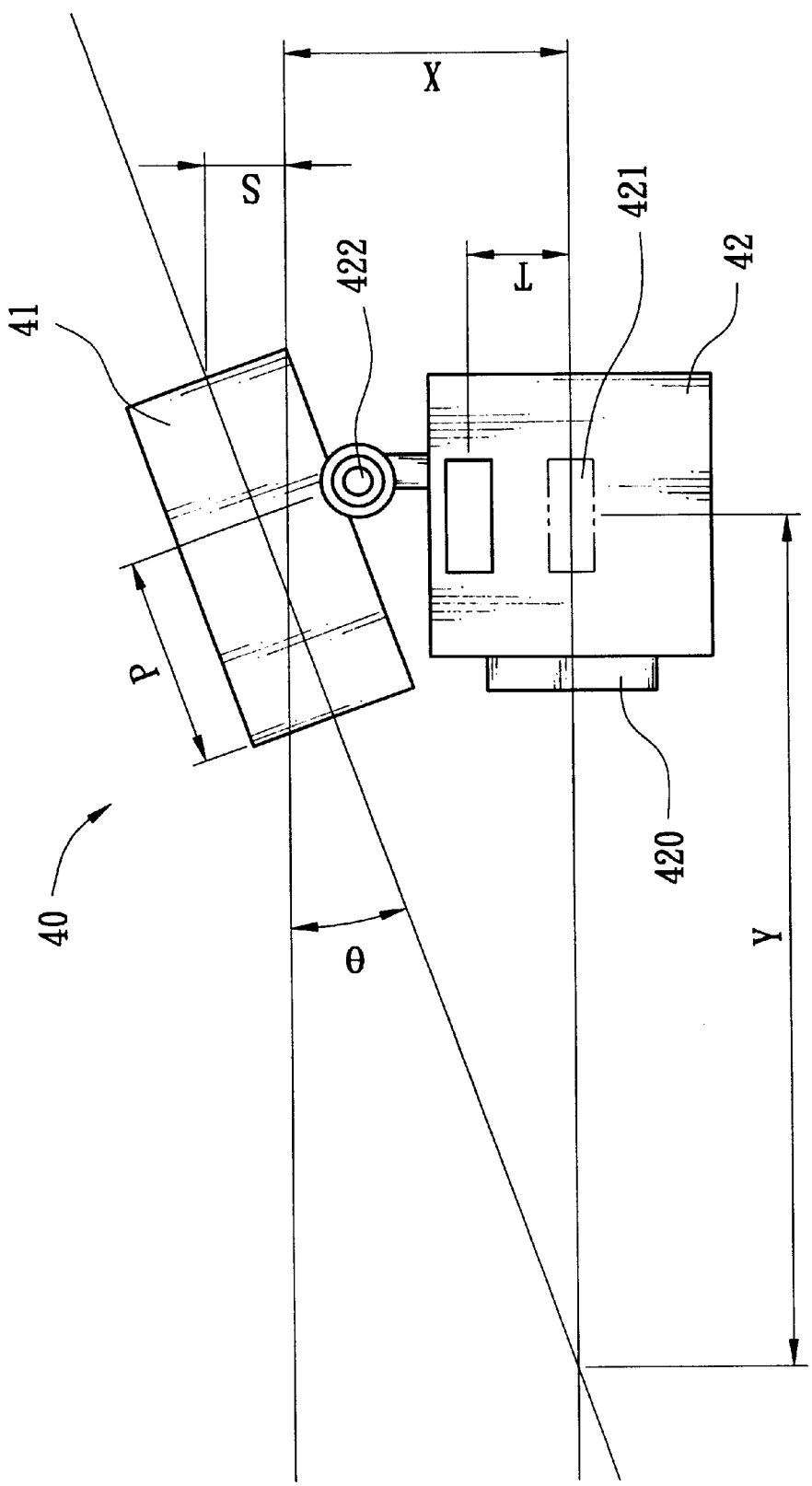
FIG. 3 is a side view schematically illustrating a geometric relationship between the parallax compensation apparatus of FIG. 2 and subject.

Referring to FIGS. 2–3, there is shown a parallax compensation apparatus for camera constructed in accordance with the invention. The apparatus of this camera differs from the one shown in FIG. 1 in that viewfinder 11a of this camera 10a may be adjusted downwardly in taking a close-up picture 20. As such, the level of eye 30 meets the optical axis of lens 12 at a subject 20 to be taken when user views the subject 20 through viewfinder 11a.

In accordance with above fact, the invention performs a manual adjustment of lens 12 to implement a manual focus of camera 10a in taking a subject in close range such as close-up, or in macro mode. For example, move lens 12 outwardly by operating a close-up adjusting rod 421 which in turns causes follower link 43 to move. As such, the optical axis of viewfinder 11a moves down to meet the optical axis of lens 12 at the subject 20 to be taken, thereby effectively reducing parallax.

Referring to FIG. 3 specifically, a geometric relationship between the parallax compensation apparatus constructed according to the principle of the invention and subject is illustrated.

As shown, the distance between camera 40 and the subject 20 is Y and the distance between optical axis of lens 420 and the optical axis of viewfinder 41 is X. In taking a close-up picture, use hand to adjust close-up adjusting rod 421. Then close-up adjusting rod 421 moves together with follower link 43 (see FIG. 4 later). As such, optical axis of viewfinder 41 meets optical axis of lens 420 in a predetermined position for taking a close-up picture when close-up adjusting rod 421 is adjusted to a suitable position. This significantly reduces parallax. In general, a predetermined distance for taking a close-up picture is 10–20 cm. This may be expressed in an equation as below:

$$\tan \theta = X/Y \quad (1)$$

where X is a fixed value. From this relationship, Y can be calculated through application of the equation 2 below.

$$\theta = \tan^{-1}(X/Y) \quad (2)$$

Figure 4:
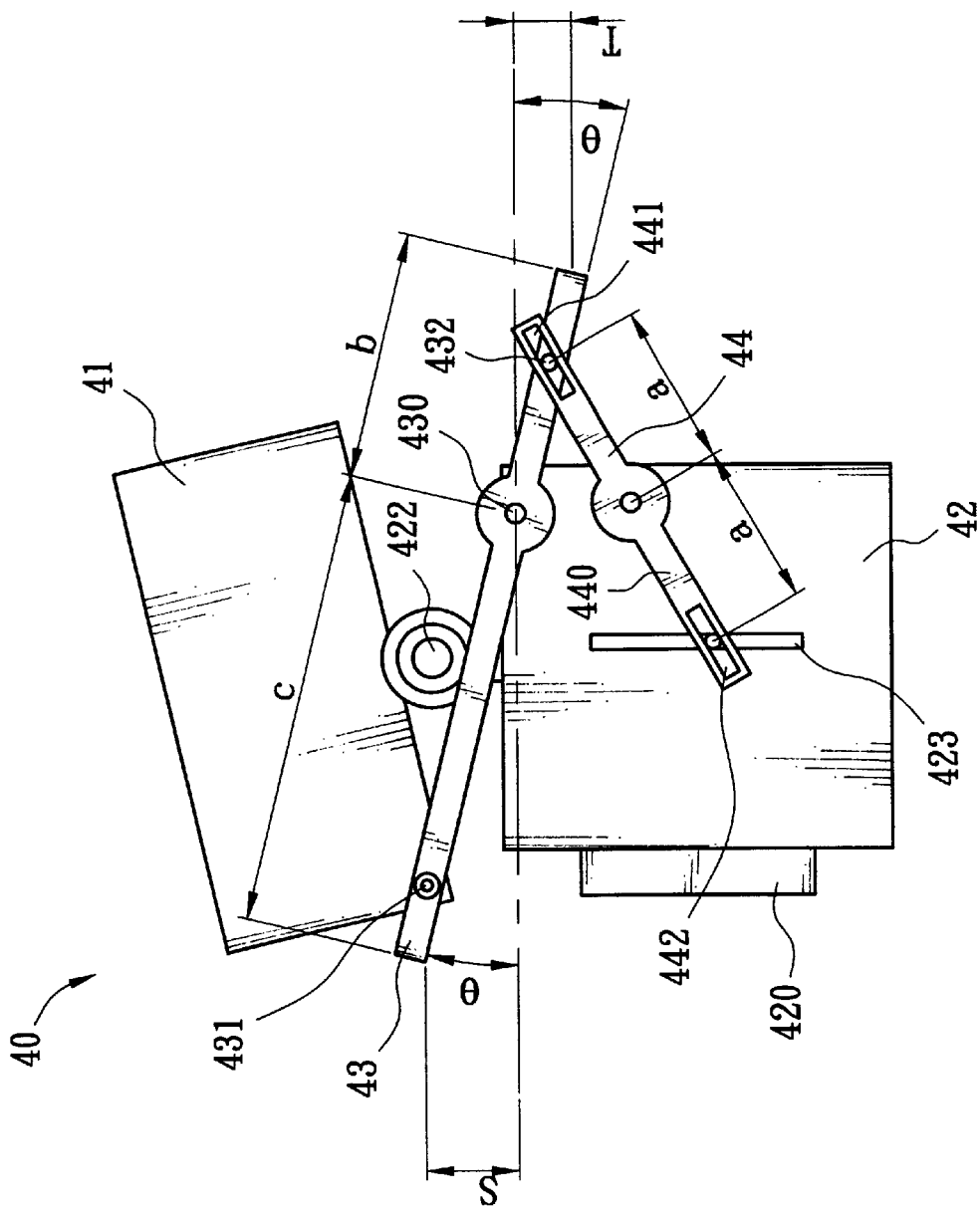
FIG. 4 is a side view schematically illustrating a first preferred embodiment of parallax compensation apparatus for camera of the invention.

Referring to FIG. 4, there is shown a first preferred embodiment of parallax compensation apparatus for camera of the invention. The parallax compensation apparatus comprises a viewfinder 41 pivotably connected to pin 422 of main body 42 of camera 40 for locating objects to be taken; a follower link 43 pivotably connected to main body 42 of camera 40 having one end pivotally connected to viewfinder 41 at a connecting pin 431 for causing viewfinder 41 to pivot accordingly; a close-up adjusting rod 421 (FIG. 3) having one end connected to attachment portion 442 at another end of adjusting lever 44 wherein follower link 43 pivots as close-up adjusting rod 421 moves along a longitudinal slot 423 on the surface of main body 42 such that optical axis of viewfinder 41 meets optical axis of lens 420 in a predetermined position for taking a picture; and an adjusting lever 44 pivotably connected to main body 42 of camera 40 at a central pin 440 having a hollow slot 441 in one end movably connected to a protrusion 432 and a hollow slot 442 in the other end movably connected to close-up adjusting rod 421 at longitudinal slot 423 as such close-up adjusting rod 421 and viewfinder 41 may move in the same direction.

As shown, for follower link 43 length b is a distance from one end to pin 430, while length c is a distance from the other end to pin 430. For adjusting lever 44, length a is a distance from either end to pin 440. P is a distance from front side of viewfinder 41 to its pin 422. S is a distance between center line of viewfinder 41 after adjusting and before adjusting. Follower link 43 is moved up a distance T as follower link 44 moves when close-up adjusting rod 421 moves down a distance T (see FIG. 3). In view of the geometry and size of follower link 43, the movement of viewfinder 41 and the geometry of close-up adjusting rod 421 can be expressed as follows:

$$\sin \theta = S/c = T/b \qquad (3)$$

As such, the up and down of viewfinder 41 can be controlled precisely by adjusting close-up adjusting rod 421 based on distances of different objects. As such, optical axis of viewfinder 41 meets optical axis of lens 420 in the subject to be taken.

Figure 5:
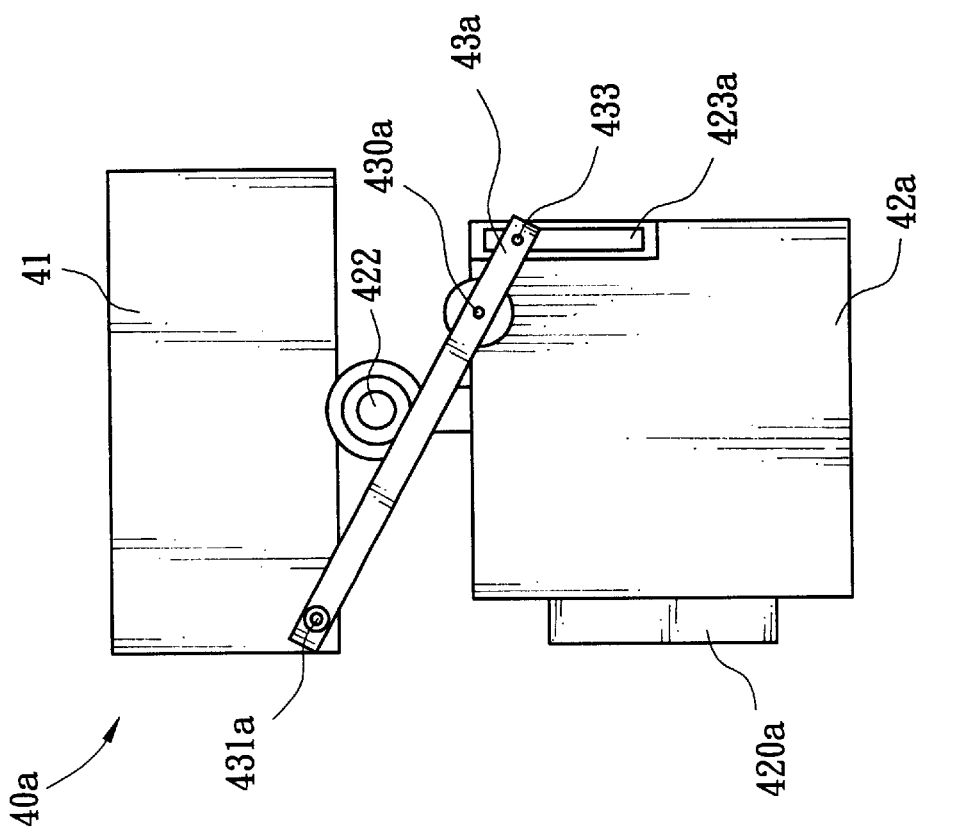
FIG. 5 is a side view schematically illustrating a second preferred embodiment of parallax compensation apparatus for camera of the invention.

Referring to FIG. 5, there is shown a second preferred embodiment of parallax compensation apparatus for camera of the invention. This embodiment differs from the first one in that the adjusting lever 44 is omitted by using follower link 43a and adjusting rod (not shown) as connecting means instead. Follower link 43a is pivotably connected to main body 42a in pin 430a. Follower link 43a and adjusting rod are formed integrally therewith. In operation, the moving direction of viewfinder 41 is opposed to the adjusting direction of follower link 43a.

Figure 6:
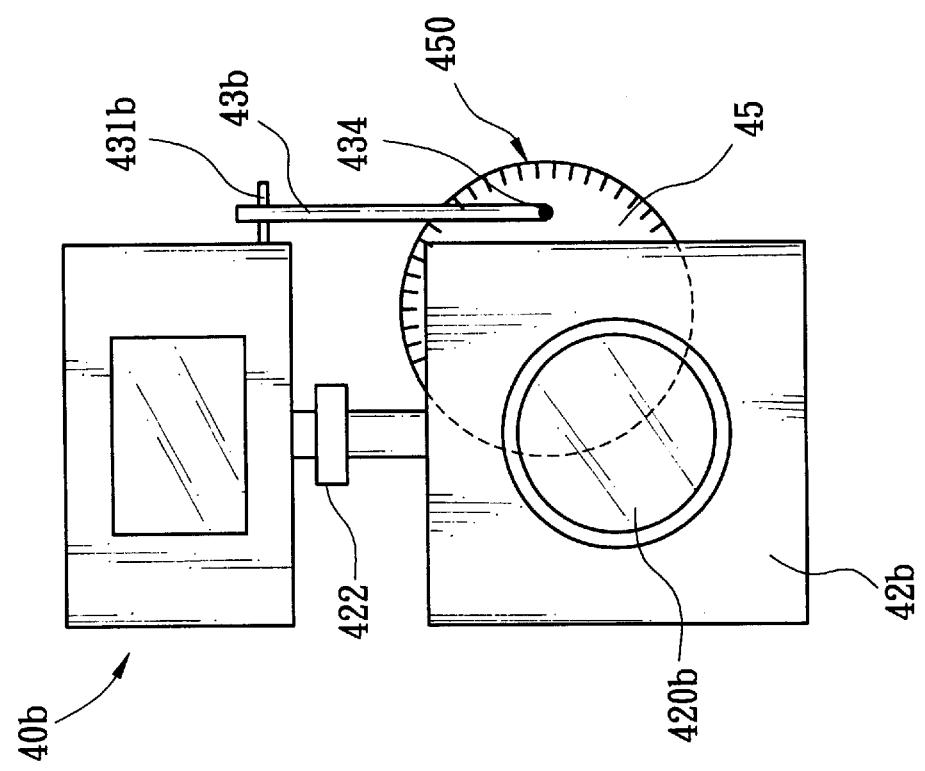
FIG. 6 is a front view schematically illustrating a third preferred embodiment of parallax compensation apparatus for camera of the invention.

Referring to FIG. 6, there is shown a third preferred embodiment of parallax compensation apparatus for camera of the invention. The parallax compensation apparatus comprises a viewfinder 41 pivotably connected to pin 422 of main body 42b of camera 40b for locating objects to be taken; an adjusting wheel pivotably connected to main body 42b having an adjusting member 450; and a follower link 43b connected to a position between center of adjusting wheel 45 and adjusting member 450 having one end connected to viewfinder 41 at a connecting pin 431b for causing follower link 43b to move as adjusting member 450 of adjusting wheel 45 rotates such that optical axis of viewfinder 41 meets optical axis of lens 420b in the subject to be taken, and the adjusting direction of adjusting wheel 45 is the same as the moving direction of viewfinder 51. In view of the foregoing, the invention is a convenient design. Further, the amount of adjustment by rotation may be clearly seen by rotating the scale of adjusting wheel 45.

ADVANTAGES OF THE INVENTION

1. The optical axis of viewfinder may meet optical axis of lens in the subject to be taken by the operating follower link unit and adjusting unit connected to camera for effecting the purpose of compensating parallax.

2. An optional adjustment unit may be additionally provided for changing direction. As such, the moving direction of adjusting unit is the same as the moving direction of viewfinder when user rotates or moves the adjusting unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for compensating for parallax in taking a close-up picture with a camera, the apparatus comprising:
    a main body of the camera, the main body having a lens;
    means for adjusting the lens based on a distance of an object to be photographed from the camera;
    a viewfinder pivotably connect to the main body of the camera for locating an object to be photographed;
    a rigid, follower link pivotably connected directly to the main body of the camera, the follower link having first and second ends, the first end of the follower link being pivotably connected to the viewfinder; and
    a rigid, adjusting lever having first and second ends, the adjusting lever being pivotably connected, directly to the main body and the first end of the adjusting lever being connected to the second end of the follower link, the connection of the adjusting lever to the follower link being separate from the connection of the follower link to the main body, the second end of the adjusting lever being connected to the means for adjusting, the adjusting lever being pivotable by movement of the means for adjusting thus causing pivoting of the follower link and movement of the viewfinder whereby an optical axis of the viewfinder meets an optical axis of the lens.

2. The apparatus according to claim 1, wherein the means for adjusting includes an adjusting rod movably connected to the main body.

3. The apparatus according to claim 1, wherein the adjusting lever is pivotably connected to the main body at a center of the adjusting lever.

4. The apparatus according to claim 1, wherein the first end of the adjusting lever has a slot defined therein and wherein a protrusion is formed on the second end of the follower link, the protrusion being slidably received in the slot in the first end of the adjusting lever.

5. The apparatus according to claim 4, wherein the second end of the adjusting lever has another slot in which at least a portion of the means for adjusting is received.

6. The apparatus according claim 5, wherein the means for adjusting includes an adjusting rod movably connected to the main body, the adjusting rod being received in the another slot of the second end of the adjusting lever.

7. The apparatus according to claim 6, wherein an angle $\theta$ is formed between the optical axis of the viewfinder and the optical axis of the lens, and wherein prior to adjustment of the viewfinder the optical axis of the viewfinder is generally parallel to the optical axis of the lens, a distance S being a distance between the optical axis of the viewfinder before adjustment and after adjustment of the viewfinder and wherein c is a length of the follower link from the pivot point at the main body to the first end of the follower link, and wherein:

$$\sin \theta = S/c.$$

8. The apparatus according to claim 7, wherein T is a distance the second end of the follower link is moved during adjustment of the viewfinder and wherein b is a length of the follower link from the pivot point at the main body to the second end of the follower link and wherein:

$$\sin \theta = T/b.$$

9. The apparatus according to claim 1, wherein an angle θ is formed between the optical axis of the viewfinder and the optical axis of the lens, and wherein prior to adjustment of the viewfinder the optical axis of the viewfinder is generally parallel to the optical axis of the lens, a distance S being a distance between the optical axis of the viewfinder before adjustment and after adjustment of the viewfinder and wherein c is a length of the follower link from the pivot point at the main body to the first end of the follower link, and wherein:

$$\sin \theta = S/c.$$

10. The apparatus according to claim 9, wherein T is a distance the second end of the follower link is moved during adjustment of the viewfinder and wherein b is a length of the follower link from the pivot point at the main body to the second end of the follower link and wherein:

$$\sin \theta = T/b.$$

11. An apparatus for compensating for parallax in taking a close-up picture with a camera, the apparatus comprising:
   a main body of the camera, the main body having a lens;
   a viewfinder pivotably connect to the main body of the camera for locating an object to be photographed;
   an adjusting wheel pivotably connected to the main body of the camera;
   a follower link having first and second ends, the first end of the follower link being pivotably connected to the adjusting wheel and the second end of the follower link being connected to the viewfinder, movement of the adjusting wheel on the main body causing movement of the follower link to adjust an optical axis of the viewfinder to meet an optical axis of the lens.

12. The apparatus according to claim 11, wherein the follower link is connected to a predetermined position between a center of the adjusting wheel and an edge of the adjusting wheel whereby an adjusting direction of the adjusting wheel is the same as a moving direction of the viewfinder.

13. The apparatus according to claim 11, wherein the viewfinder is pivotably connected to the main body along an axis which is perpendicular to the axis at which the adjusting wheel is connected to the main body.

14. The apparatus according to claim 13, wherein the axis about which the adjusting wheel is pivotable is non-coincident with the optical axis of the lens of the camera.

15. The apparatus according to claim 13, wherein the axis about which the adjusting wheel is pivotable is spaced from the lens of the camera.

16. The apparatus according to claim 11, wherein the axis about which the adjusting wheel is pivotable is non-coincident with the optical axis of the lens of the camera.

17. The apparatus according to claim 11, wherein the axis about which the adjusting wheel is pivotable is spaced from the lens of the camera.

* * * * *